(12) United States Patent
Tesanovic et al.

(10) Patent No.: US 12,005,658 B2
(45) Date of Patent: Jun. 11, 2024

(54) YARD CONTROL FEATURES

(71) Applicant: ams Sensors Singapore Pte. Ltd., Singapore (SG)

(72) Inventors: Bojan Tesanovic, Eglisau (CH); Hartmut Rudmann, Jona (CH); Nicola Spring, Ziegelbrücke (CH); Sebastiano Lazzi Gazzini, Zurich (CH)

(73) Assignee: AMS SENSORS SINGAPORE PTE. LTD., Singapore (SG)

( * ) Notice: Subject to any disclaimer, the term of this patent is extended or adjusted under 35 U.S.C. 154(b) by 396 days.

(21) Appl. No.: 17/436,823

(22) PCT Filed: Mar. 12, 2020

(86) PCT No.: PCT/SG2020/050133
§ 371 (c)(1),
(2) Date: Sep. 7, 2021

(87) PCT Pub. No.: WO2020/185167
PCT Pub. Date: Sep. 17, 2020

(65) Prior Publication Data
US 2022/0176597 A1  Jun. 9, 2022

Related U.S. Application Data

(60) Provisional application No. 62/816,970, filed on Mar. 12, 2019.

(51) Int. Cl.
*B29D 11/00* (2006.01)
*B29C 43/02* (2006.01)
(Continued)

(52) U.S. Cl.
CPC ...... *B29D 11/00307* (2013.01); *B29C 43/021* (2013.01); *B29C 43/38* (2013.01);
(Continued)

(58) Field of Classification Search
CPC ........ B29D 11/00307; B29D 11/00365; B29D 11/00298; B29D 11/00413; B29L 2011/0016; G02B 3/0075
See application file for complete search history.

(56) References Cited

U.S. PATENT DOCUMENTS

| 9,876,051 B2 * | 1/2018 | Kubala | H01L 27/14643 |
| 2007/0216047 A1 * | 9/2007 | Rudmann | B29D 11/00365 |
| | | | 264/2.6 |

(Continued)

FOREIGN PATENT DOCUMENTS

| CN | 102004274 A | 4/2011 |
| WO | 2015174930 A1 | 11/2015 |

OTHER PUBLICATIONS

Chinese Patent Office Action for Application No. 202080020432.2 dated Sep. 30, 2022 (12 pages including machine English translation).

(Continued)

*Primary Examiner* — Atul P. Khare
(74) *Attorney, Agent, or Firm* — VIERING, JENTSCHURA & PARTNER mbB

(57) ABSTRACT

A method of manufacturing a plurality of optical elements (140) comprising the steps of providing a substrate (120), and a tool (101) comprising a plurality of replication sections (106), each defining a surface structure of one of the optical elements (140), the tool (101) further comprising at least one contact spacer portion (112), aligning the tool (101) and the substrate (120) with respect to each other and bringing the tool (101) and a first side of the substrate (122) together, with replication material (124) between the tool (101) and the substrate (120), the contact spacer portion (112) contacting the first side of the substrate (122), and thereby causing the spacer portion (112) to adhere to the first side of the substrate (122), hardening the replication material (Continued)

(124), wherein the substrate (120) has yard line features (138) around at least a portion of the replication sections (106), the yard line features (138) containing the replication material (124) on a first side of the yard line with respect to the tool (101) and the substrate (120).

4 Claims, 7 Drawing Sheets

(51) Int. Cl.
*B29C 43/38* (2006.01)
*B29C 64/112* (2017.01)
*B29C 64/188* (2017.01)
*B29C 64/30* (2017.01)
*B29C 64/379* (2017.01)
*G02B 3/00* (2006.01)
*B29L 11/00* (2006.01)

(52) U.S. Cl.
CPC .......... *B29C 64/112* (2017.08); *B29C 64/188* (2017.08); *B29C 64/30* (2017.08); *B29C 64/379* (2017.08); *B29D 11/00298* (2013.01); *B29D 11/00365* (2013.01); *B29D 11/00413* (2013.01); *G02B 3/0075* (2013.01); *B29L 2011/0016* (2013.01)

(56) References Cited

U.S. PATENT DOCUMENTS

| | | |
|---|---|---|
| 2007/0216048 A1 | 9/2007 | Rudmann et al. |
| 2007/0216049 A1* | 9/2007 | Rudmann ........ B29D 11/00365 264/2.7 |
| 2007/0230948 A1 | 10/2007 | Hsiao-Wen et al. |
| 2008/0054507 A1 | 3/2008 | Rudmann et al. |
| 2011/0024030 A1 | 2/2011 | Rudmann et al. |
| 2013/0057637 A1 | 3/2013 | Sen et al. |
| 2014/0017614 A1 | 1/2014 | Schaper |
| 2016/0313540 A1 | 10/2016 | Kao et al. |
| 2017/0087784 A1 | 3/2017 | Bietsch et al. |

OTHER PUBLICATIONS

International Search Report and Written Opinion for Application No. PCT/SG2020/050133 dated Sep. 1, 2020 (16 pages).

* cited by examiner

YARD CONTROL FEATURES

TECHNICAL FIELD

This disclosure relates to microfluidic alignment features.

BACKGROUND

Optical devices that include one or more optical radiation emitters and one or more optical sensors can be used in a wide range of applications including, for example, distance measurement, proximity sensing, gesture sensing, and imaging. Small optoelectronic modules such as imaging devices and light projectors employ optical assemblies that include lenses or other optical elements stacked along the device's optical axis to achieve desired optical performance Replicated optical elements include transparent diffractive and/or refractive optical elements for influencing an optical beam. In some applications, such optoelectronic modules can be included in the housings of various consumer electronics, such as mobile computing devices, smart phones, or other devices.

SUMMARY

The present disclosure describes optical and optoelectronic assemblies that include micro-spacers, as well as methods for manufacturing such assemblies.

The substrate may be a "wafer", or other base element, with an additional structure added to it, for example with a hardened replication material structure adhering to it, defining a surface of the plurality of optical elements, with some lithographically added or removed features (such as apertures, etc.) or with some other structure. The substrate may comprise any material or material combination.

The optical elements may be any elements influencing light that is irradiating them including but not restricted to lenses/collimators, pattern generators, deflectors, mirrors, beam splitters, elements for decomposing the radiation into its spectral composition, etc., and combinations thereof. Both a replicated structure on one side of a substrate, and an ensemble of two aligned replicated optical elements on two sides of a substrate are called an "optical element".

The tool (or "replication tool") may comprise a first, hard material forming a rigid back plate and a second, softer material portion (replication portion) that forms both the contact spacer portion(s) and the replication sections. Generally, the contact spacer portion(s) may be of the same material as the portion of the tool that forms the replication sections, and may merely be structural features of the tool (not added elements). As an alternative, the contact spacer portions may comprise an additional material, for example a coating of a soft and/or adhesive material on an outermost surface.

As an alternative to a low stiffness material like PDMS, the contact spacers may also comprise an adhesive, for example an adhesive layer. Using a low stiffness material for the entire replication portion of the tool is advantageous regarding its manufacturing, as no separate step for adding the contact spacers or a coating thereof is required. The entire replication portion may be manufactured in a single shape by replicating (molding, embossing etc.) from a master or sub-master that also includes the contact spacer portion(s).

The contact spacer portions are operable to rest against the substrate during replication, with no material between the contact spacer portions and the substrate. The contact spacer portions may be contiguous or may comprise a plurality of discrete portions around the periphery or distributed over a large portion of the periphery and/or an interior of the replication surface. In other words, the contact spacer portion(s) may be in any configuration that allows the replication tool to rest against the substrate. For example, the distribution of the contact spacer portion(s) is such that contact spacer portion(s) are on both sides of every in-plane line through the center of mass of the tool. The spacers are arranged and configured such that if the tool lies on the substrate, the thickness (the z-dimension perpendicular to the substrate and tool plane) is defined by the spacer portions.

In some, embodiments, a method of manufacturing a plurality of optical elements includes providing a substrate, providing a tool comprising, on a replication side, a plurality of replication sections, each replication section defining a surface structure of one of the optical elements, the tool further comprising at least one contact spacer portion, the contact spacer portion protruding, on the replication side, further than an outermost feature of the replication sections, aligning the tool and the substrate with respect to each other and bringing the tool and a first side of the substrate together, with replication material between the tool and the substrate, the contact spacer portion contacting the first side of the substrate, and thereby causing the spacer portion to adhere to the first side of the substrate, hardening the replication material, and separating the tool from the substrate with the hardened replication material adhering to the substrate, wherein the substrate has yard line features around at least a portion of the replication sections, the yard line features configured to contain the replication material on a first side of the yard line with respect to the substrate.

Implementations can include one or more of the following features: the yard line features surround the replication material deposited onto the substrate. Depositing a first volume of replication material followed by a second volume of replication material, the second volume greater than the first volume. Removing the yard line features from the substrate.

In some embodiments, a method of manufacturing a plurality of optical elements includes providing a substrate having a resist layer on a first side of the substrate, providing a tool comprising, on a replication side, a plurality of replication sections, each replication section defining a surface structure of one of the optical elements, the tool further comprising at least one contact spacer portion, the contact spacer portion protruding, on the replication side, further than an outermost feature of the replication sections, aligning the tool and the substrate with respect to each other and bringing the tool and the first side of the substrate together, with replication material between the tool and the substrate, the contact spacer portion contacting the first side of the substrate, and thereby causing the spacer portion to adhere to the first side of the substrate, hardening the replication material into a feature and a yard, separating the tool from the substrate with the hardened yard material adhering to the substrate and to the resist layer, and removing the resist layer from the substrate, thereby removing the hardened material adhered to the resist layer.

Implementations can include one or more of the following features: directing a laser beam around a perimeter of each replication section prior to separating the tool from the substrate. Directing the laser beam comprises cutting through the yard material at the perimeter of each replication section, thereby separating the feature and the hardened yard material. Removing the hardened yard material with a stripper. The hardened yard line material surrounds the replication material deposited onto the substrate. Depositing a first volume of replication material followed by a second volume of replication material, the second volume greater than the first volume.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
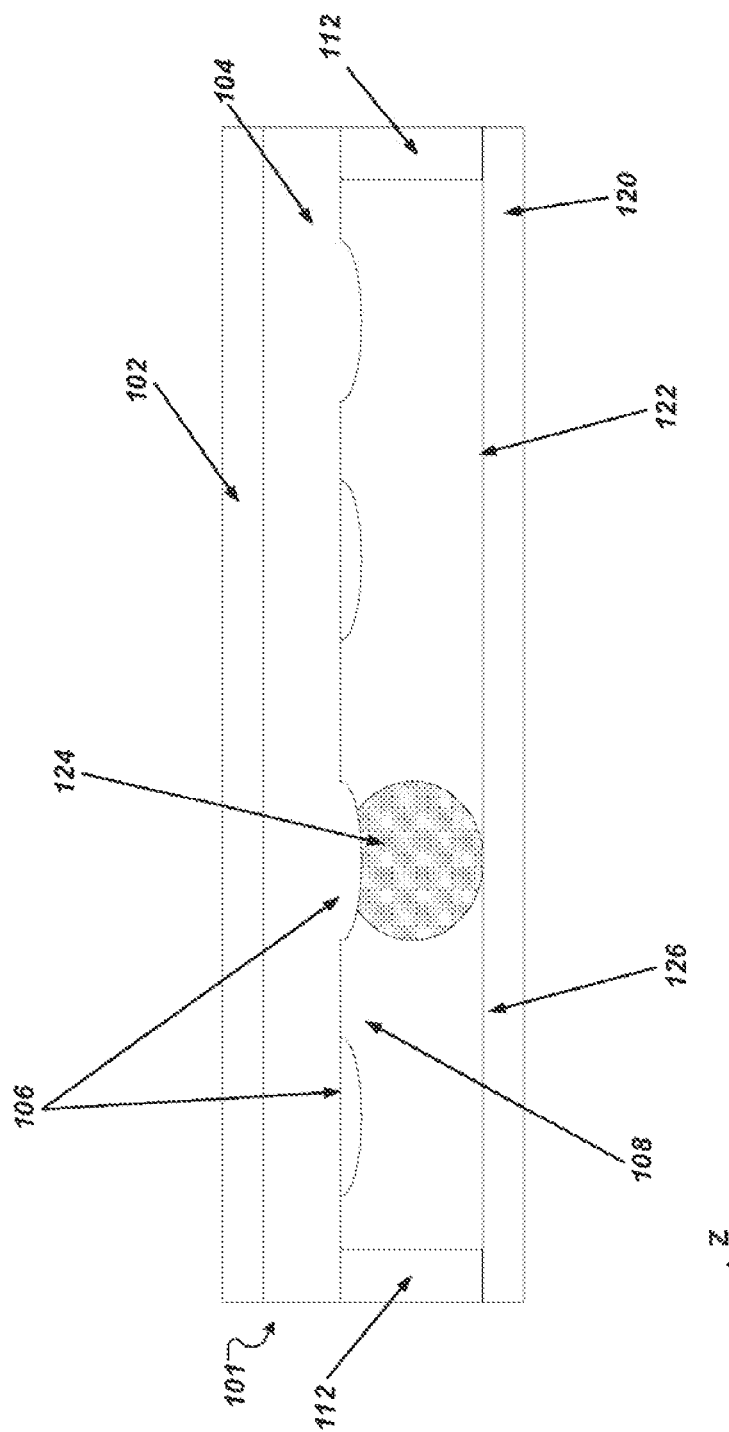
FIG. 1 illustrates an example cross sectional tool/substrate structure for replication.

FIG. 1 schematically shows a cross section through a tool 101 and a substrate 120. The tool 101 in the shown embodiment comprises a rigid backplate 102 of a first material, for example glass, and a replication portion 104 of a second, softer material, for example PDMS. The replication portion forms a replication surface 108 comprising a plurality of replication sections 106, the surface of each of which is a (negative) copy of a surface shape an optical element to be manufactured. The replication sections 106 can be convex and thus define a concave optical element surface, or be convex and define a concave optical element surface.

The replication portion 104 has contact spacer portions 112 that are illustrated as arranged peripherally. The contact spacer portions 112 are the structures of the replication tool 101 that protrude the furthest into the z direction. The contact spacer portions are essentially flat and, thus, are operable to rest against the substrate 120 during replication, with no material between the contact spacer portions 112 and the substrate 120. The contact spacer portions 112 may, for example, form a ring around the periphery of the replication surface 108, may comprise a plurality of discrete portions around the periphery, or may comprise a plurality of discrete portions distributed over a large portion of the periphery and/or an interior of the replication surface 108.

The substrate 120 has a first side (e.g., substrate surface 126) and a second side and can be any suitable material, for example glass. The substrate 120 further has a structure added to it to which the replica is to be aligned. The structure may, for example, comprise a coating 122 structured in the x-y-plane, such as a screen with apertures, or a structured IR filter etc. The structure may in addition, or as an alternative, comprise further features like markings, etc. Further, or as another alternative, the structure may comprise a hardened replication material structure constituting a surface of the optical elements.

For replicating the replication surface 108 of the tool 101, replication material 124 is applied to the substrate 120 or the tool 101 or both the tool 101 and the substrate 120. Such application of replication material 124 may include application of a plurality of portions of replication material 124, one portion for each of the replication sections, to the tool 101 and/or the substrate 120 (although a single portion of replication material 124 is illustrated in the figure). Each portion may, for example, be applied by squirting or jetting one droplet or a plurality of droplets, by a dispensing tool that may for example work in an inkjet-printer-like manner. Each portion may optionally consist of a plurality of sub-portions that come into contact with each other only during replication. Generally, the droplets are of epoxy.

After application of the replication material 124, the substrate 120 and the tool 101 are aligned with respect to each other. To this end, a process similar to the one used in so-called mask aligners may be used. The alignment process may include aligning at least one particular feature (preferably two features are used) of the tool 101 and/or of the substrate 120 with at least one particular feature of the substrate 120 or the tool 101, respectively, or with a reference point of an alignment device. Suitable features for this include well-defined elements of the structure itself (such as a defined corner of a structured coating or a lens peak etc.), specifically added alignment marks, or possibly also edges etc. of the base element etc. Alignment also includes, as is known in the art, precisely making parallel the tool and substrate surfaces to avoid wedge errors; such parallelization may take place prior to the x-y-alignment.

Subsequent to the alignment, the substrate 120 and the tool 101 are brought together, with the contact spacer portions 112 resting against the substrate surface and defining (if present, together with the floating spacers) the z dimension and also locking the tool against x-y-movements. Thereafter, the substrate-tool-assembly is removed from the alignment station and transferred to a hardening station.

The replication portion 104 of the tool, or at least a surface of the contact spacer portions 112, is made of a material with a comparably low stiffness so that it can, under "normal" conditions where for example no more pressure than the one caused by gravity forces of the tool lying on the substrate or vice versa, adapt to roughnesses on a micrometer and/or sub-micrometer scale and, thus, may form an intimate connection to the substrate surface. In addition, the replication portion of the tool or at least the surface of the contact spacer portion may have a comparably low surface energy to make such adaptation to roughnesses on a micrometer and/or sub-micrometer scale favorable. A preferred example of such a material is polydimethylsiloxane PDMS.

The prior replication steps include hardening the replication material 124 after the replication tool 101 and the base element have been moved towards each other with the replication material 124 between them, and subsequently removing the replication tool 101.

Substrate Level Yard Control/Flow Control Features

Figure 2:
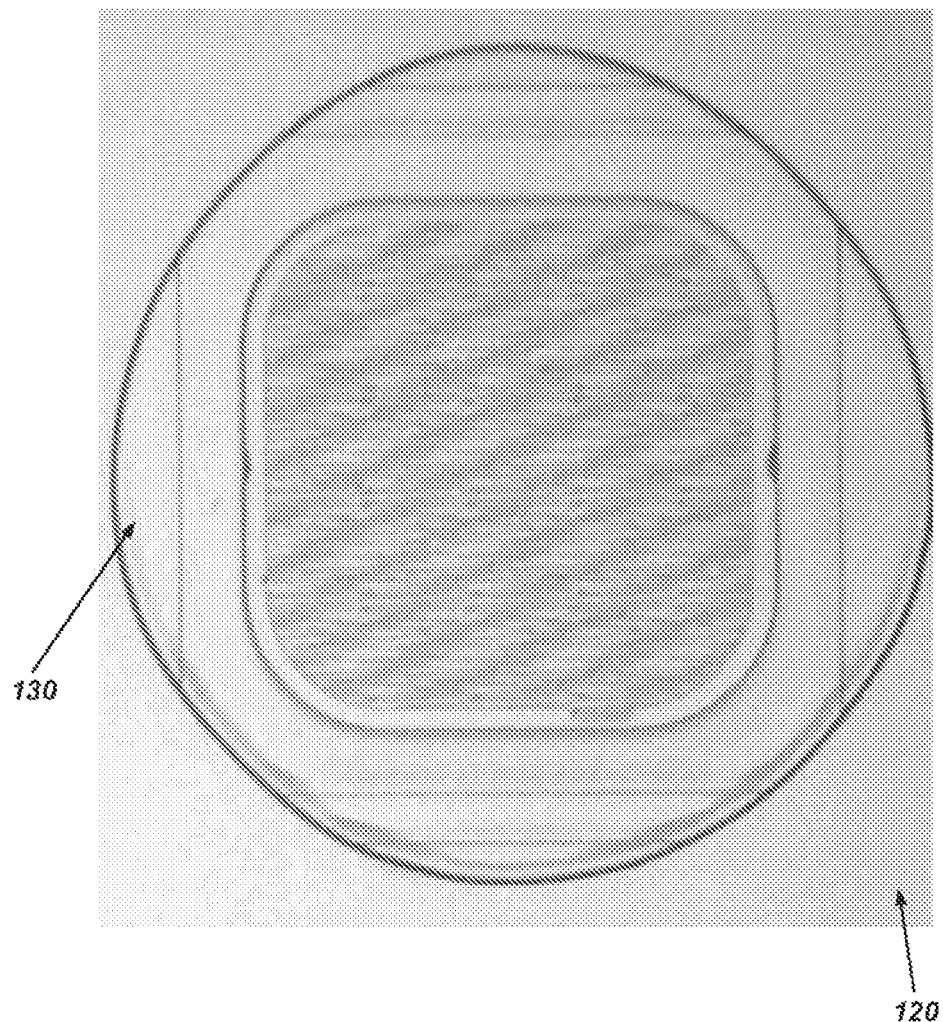
FIG. 2 shows a replicated optical feature with a yard.
Figure 3A:
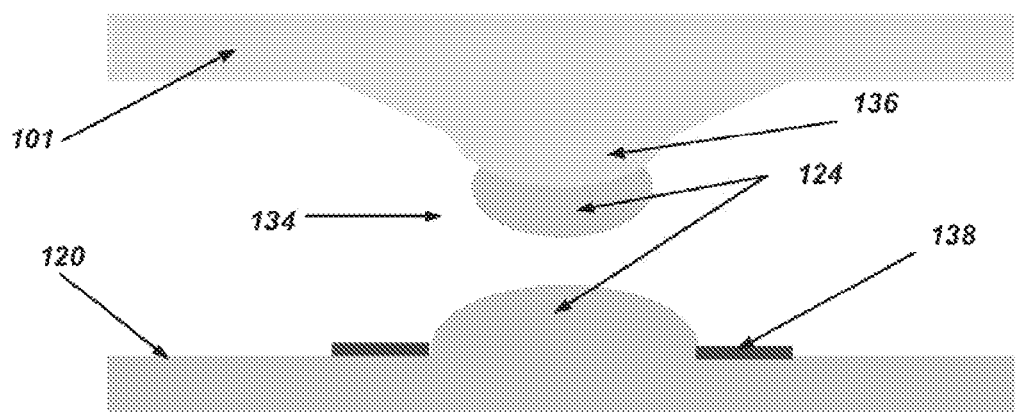
FIGS. 3A-3C shows a process of employing yard control features.
Figure 3B:
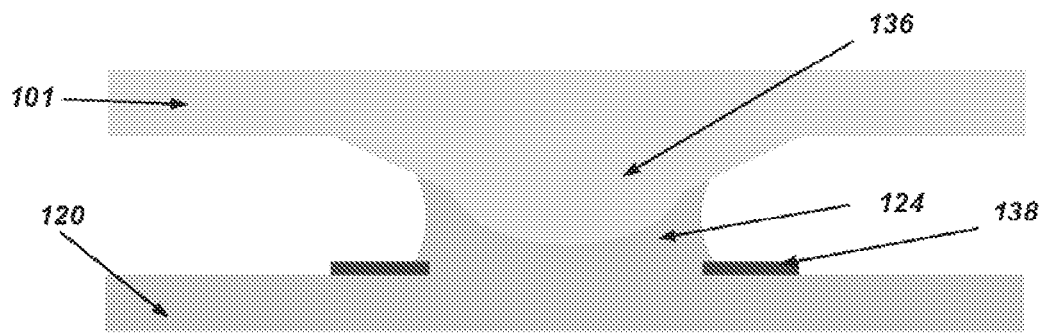
Figure 3C:
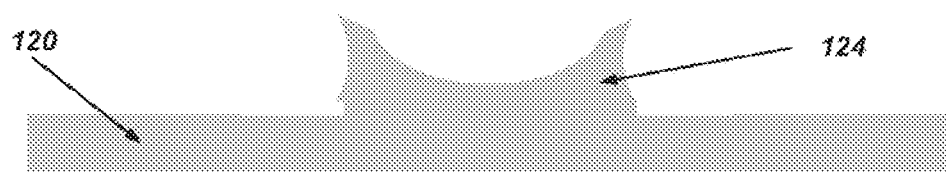
Figure 4A:
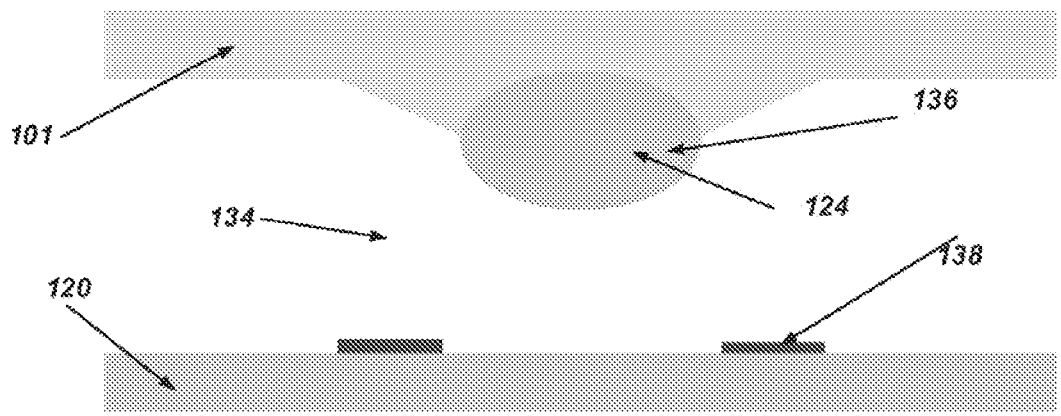
FIGS. 4A-4C shows a process of employing yard control features.
Figure 4B:
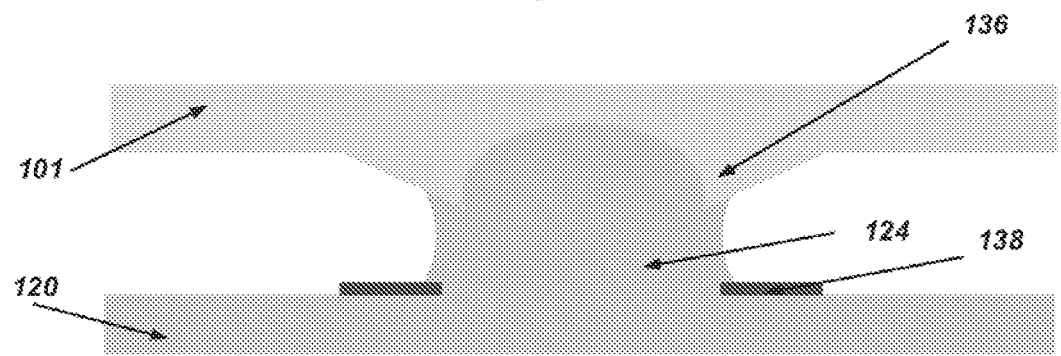
Figure 4C:
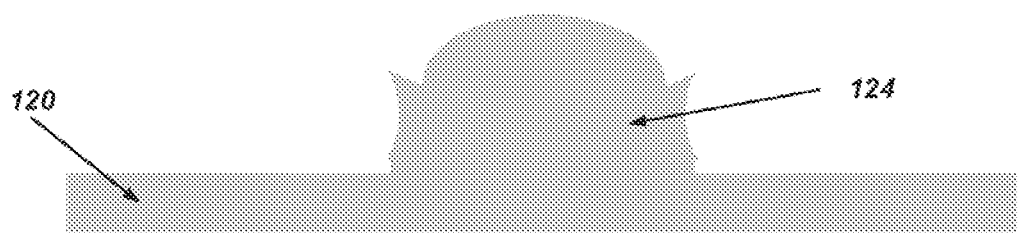

Referring to FIG. 2, during replication, excess replication material or epoxy applied during jetting normally overflows the region of interest and forms a yard 130 when the tool and the substrate 120 (e.g., glass) are brought into contact. The yard 130 is typically a circle shape, as shown. This circular yard 130 results from more epoxy 124 being added during the replication process than each structure requires, causing an overflow. The additional epoxy 124 ensures that the complete volume of replication material needed for a particular structure is available (as the tolerance of the epoxy volume is not zero), and the extra fluid pools to form the yard 130.

To control epoxy flow during replication, yard line features (also called "yard lines," "line features," or "yard line features") can be included in the tool 101 design to control the fluid flow of the replication material 124 while it is liquid. Such features can be included in the mastering process itself (during laser writing) or can be added afterwards in a lithomold process where the features can be structured into an additional layer of epoxy. The yard line features described herein can be integrated in all kind of masters fabricated by different technologies (EBL, laser writer, etc.).

In some instances there is insufficient space on the substrate 120 for an extended yard feature or the volume and shape of the tool 101 used in the replication process leads to difficulties in the control of the flow of the replication material 124. In such cases an additional flow control feature can be implemented on the substrate 120 as a temporary or permanent structure to help in guiding and/or containing the liquid replication material 124 during the replication process. This arrangement also allows a controlled local dispensing of replication material 124 on the substrate 102 instead of the tool 101 or a combination of both (replication material 124 on the substrate 102 and the tool 101).

FIGS. 3A-4C show the process of employing yard control features 134 used to create yard structures 130 that control excess replication material 124 volume. Such yard control features 134 can include tool features 136 in the tool 101 itself, and in particular include substrate yard features 138 that are on the substrate 120 itself. Substrate yard features 138 on the substrate level can reduce the overall footprint and shape of the resulting yard 130, and better define the excess replication material 124 volume.

The substrate yard features 138 are fabricated so as to surround the replication material 124 that is to be deposited onto the substrate 120. The first step in such a replication process typically uses a small volume of replication material 124, with a small volume tolerance. This small volume is followed by use of a larger volume to define a larger structure confined by the first small structure created. The substrate yard features 138 can create ring-like features to act as a fluid barrier.

The creation of a first control structure in a multistep replication can use a similar process as the replication itself, where the required structure is fabricated as a masterstructure (e.g., by laserwriting or other technologies), from which a negative tool can be formed—as example in a soft PDMS material on a glass backplate as described above.

This tool can then be used to create a first structure, by dispensing material on the tool, bringing it in contact with the substrate and hardening of the replication material before separation of tool and substrate, to guide the material of a successive step. This process can be repeated multiple times with different structures depending on the complexity of the final structure.

The substrate yard features 138 can be created in different ways. In one method, a photolithographic process is used to create the substrate yard features 138 using a mask or direct exposure in a resist layer on the substrate 120. In this case, the substrate yard features 138 can be removed with a stripper after the replication and curing of the material (resulting in the configurations shown in FIGS. 3C and 4C). In two step replication (FIGS. 3A-C), a simpler and smaller control feature is first created and then the more complex and/or bigger structure is replicated over it. This method includes the possibility of dividing the volume of replication material required to form the desired structure in any possible ratio between the tool 101 and the substrate 120. This allows for a better control of the material flow and permits larger volumes to be dispensed on smaller areas.

Figure 5A:
FIGS. 5A-C show different embodiments of substrate yard features.
Figure 5B:
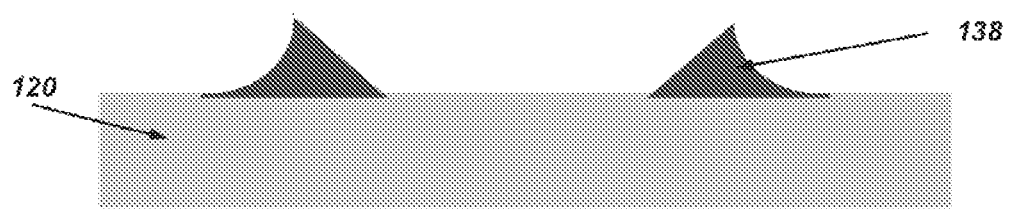
Figure 5C:
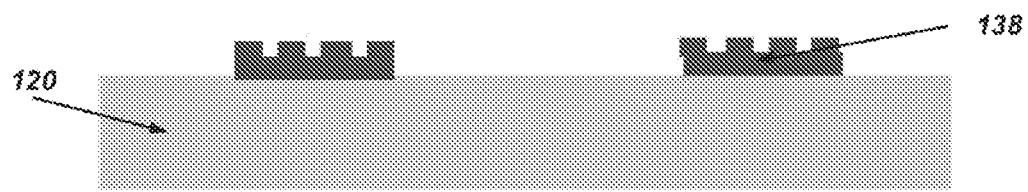

FIGS. 5A-C show different embodiments of substrate yard features 138, which can be selected depending on the replication process used and final requirements.

Yard Removal by Liftoff

As discussed above with respect to FIG. 2, excess replication material 124 or epoxy applied during jetting overflows the region of interest and forms a yard 130 when the tool and the substrate 120 are brought into contact. The additional epoxy 124 ensures that the complete volume of replication material needed for a particular structure is available (as the tolerance of the epoxy volume is not zero), and the extra fluid pools to form the yard 130.

In some instances there is insufficient space on the substrate 120 for an extended yard feature or the volume and shape of the tool 101 used in the replication process leads to difficulties in the control of the flow of the replication material 124. Yards 130 require excess space and significantly increases the footprint of modules. In such cases, removing the yards 130 from the substrate 120 is beneficial.

Referring to FIGS. 6A-E, a resist layer 160 coated on the substrate 120 can be used to remove unwanted yard structures 130 generated by excess replication material 124 volume. To implement the yard removal process, the resist layer 160 is first coated on the substrate 120. Then the structure 162 in the resist layer 160 is created. The hardened replication feature 140 is created with replication material 124; when hardened the replication material 124 forms the desired hardened replication feature 140 and the excess replication material 124 results in a yard 130, FIG. 6C.

Figure 6A:
FIGS. 6A-6F shows a process of removing yard features.
Figure 6B:
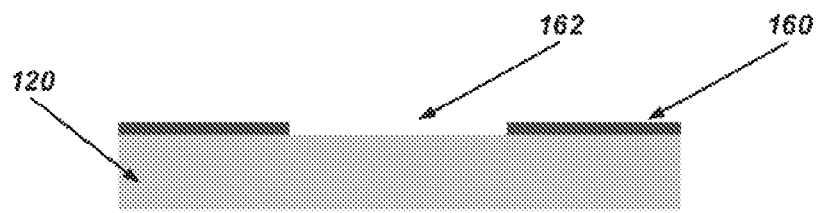
Figure 6C:
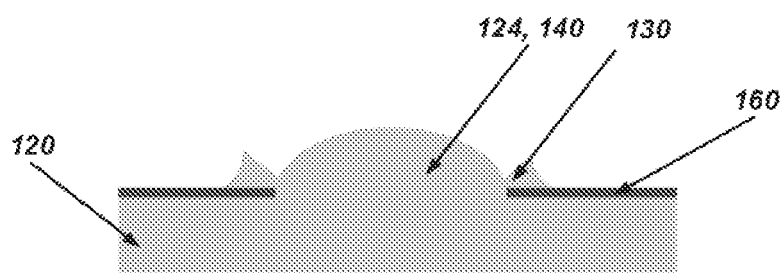
Figure 6D:
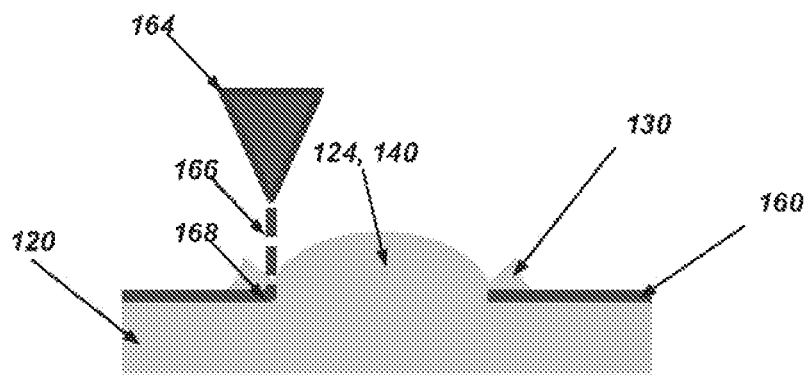

To remove the undesired yard feature 130, a laser 164 directs a laser beam 166 to cut at the intersection between the yard 130 with the hardened replication feature 140, FIG. 6D. The intersection region is generally designated as 168 and in the example shown is a circle around the hemispherical hardened replication feature 140. To separate the hardened replication material 124 of the yard 130 from that of the hardened replication feature 140, the laser 164 can direct the laser beam 166 around the entire intersection region 158, e.g., in a circle that is the circumference of the hardened replication feature 140.

Figure 6E:
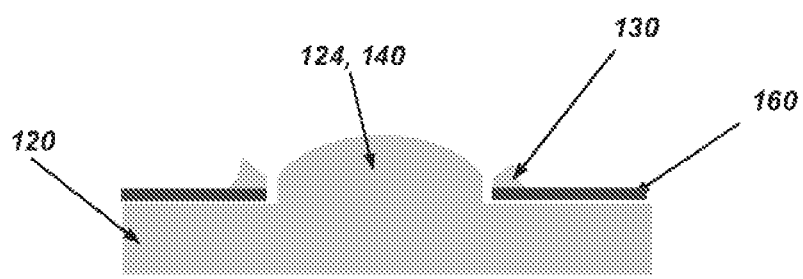
Figure 6F:
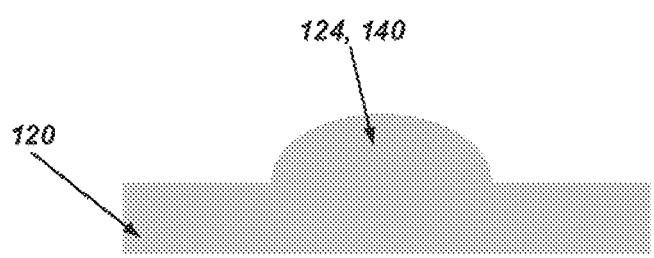

Once the laser cut has been completed at the intersection region 168, the resist layer 162 together with the yard 130 is then lifted off, FIG. 6E. The result is the final hardened replication feature 140 without a yard 130, as shown in FIG. 6F.

Previous methods of removing undesired yards 130 also use a laser, specifically by laser ablation. This process uses a laser beam to physically remove the hardened epoxy of the yard. This process has a very low throughput as the complete yard area needs to be scanned and ablated by the laser, and not simply the perimeter of a replicated feature. In addition to scanning the area of each yard, the laser ablation scan must remove every layer of each yard. In some cases the entire yard area must be ablated multiple times to obtain a good result. The entire process can be lengthy. Additionally, the ablation process can be difficult to control because height, thickness, and volume of the yard structure varies as a consequence of the overflowed replication material being inconstant.

The yard liftoff process described with respect to FIGS. 6A-F reduces laser operation significantly by only requiring the cutting of a ring at the intersection region 168 of the hardened replication feature 140 and the yard 130. The bulk of the yard material 130 is removed by stripping the resist layer 160 below the yard from the surface of the substrate 120.

The replication manufacturing features as described herein advantageously enable the creation of densely packed layouts with, and modules or stacks where optical structures and mechanical (e.g., spacers) or electrical functionality (e.g., bond pads) are combined. The features can be used to generate more dense layouts, create packages including eye safety features, reduce the number of process steps by venting channel generation, and increase precision.

A number of embodiments of the invention have been described. Nevertheless, it will be understood that various modifications may be made without departing from the spirit and scope of the invention. Accordingly, other embodiments are within the scope of the following claims.

The invention claimed is:

1. A method of manufacturing a plurality of optical elements, the method comprising:

providing a substrate;

providing a tool comprising, on a replication side thereof, a plurality of replication sections, each of the replication sections configured to define a surface structure of a respective one of the optical elements, the tool further comprising at least one contact spacer portion, the at least one contact spacer portion protruding, on the replication side, further than an outermost feature of the replication sections;

aligning the tool and the substrate with respect to each other and bringing the tool and a first side of the substrate together, with replication material arranged between the tool and the substrate, the at least one contact spacer portion contacting the first side of the substrate, and thereby causing the at least one contact spacer portion to adhere to the first side of the substrate and shaping the replication material into the optical elements, wherein the optical elements abut yard line features arranged on the first side of the substrate around at least a portion of the replication sections with the tool and substrate brought together, the yard line features acting as a fluid barrier for the replication material forming the optical elements;

hardening the shaped replication material;

separating the tool from the substrate with the hardened replication material and the at least one contact spacer portion adhering to the substrate; and removing the yard line features from the first side of the substrate.

2. The method of claim 1, wherein the yard line features surround the replication material on the first side of the substrate.

3. The method of claim 1, comprising depositing a first volume of replication material followed by a second volume of replication material onto the first side of the substrate, the second volume greater than the first volume.

4. The method of claim 1, comprising removing the yard line features from the substrate with a stripper.

* * * * *